United States Patent [19]

Iwama

[11] Patent Number: 4,557,597

[45] Date of Patent: Dec. 10, 1985

[54] METHOD OF DISCRIMINATING BETWEEN THE FRONT AND BACK SIDES OF PAPER SHEETS

[75] Inventor: Takasuke Iwama, Kunitachi, Japan

[73] Assignee: Musashi Engineering Kabushiki Kaisha, Tokyo, Japan

[21] Appl. No.: 496,382

[22] Filed: May 20, 1983

[30] Foreign Application Priority Data

May 31, 1982 [JP] Japan ........ 57-91144

[51] Int. Cl.[4] ........ G06K 9/74

[52] U.S. Cl. ........ 356/71; 209/534; 250/556; 271/65; 356/432

[58] Field of Search ........ 356/429, 432, 71; 250/566, 556; 209/534; 382/7, 18, 36; 209/551; 271/65, 186

[56] References Cited

U.S. PATENT DOCUMENTS

| | | | |
|---|---|---|---|
| 3,753,617 | 8/1973 | Ehrat | 250/556 X |
| 4,435,834 | 3/1984 | Pauli et al. | 250/556 X |

FOREIGN PATENT DOCUMENTS

| | | | |
|---|---|---|---|
| 0082989 | 7/1981 | Japan | 356/432 |
| 2111956 | 12/1981 | United Kingdom | 209/534 |

*Primary Examiner*—Vincent P. McGraw
*Assistant Examiner*—Robert Thompson, III
*Attorney, Agent, or Firm*—Brooks Haidt Haffner & Delahunty

[57] ABSTRACT

Described is a method of discriminating between front and back sides of the paper sheet bearing different printed design on the front and back sides, the printed design being in dissymmetry both in the up and down direction and in the left and right direction. The amount of light transmitted through plural portions of the paper sheet is sensed for deriving pattern signals indicative of changes in the amount of transmitted light, said pattern signals being then compared to reference pattern signals stored in advance to permit discrimination between the upper and lower edges and between the front and back sides of the sheet.

1 Claim, 2 Drawing Figures

METHOD OF DISCRIMINATING BETWEEN THE FRONT AND BACK SIDES OF PAPER SHEETS

BACKGROUND OF THE INVENTION

This invention relates to a method of discriminating between front and reverse sides of a paper sheet and more particularly to a novel method of discriminating between the front and back sides and between upper and lower edges of the paper sheet with high precision through comparison of signal waveforms derived from the printed pattern design on the sheets as sensed at several portions of the paper sheets.

There are a variety of methods presently used for discriminating between the front and reverse sides of the paper sheet. According to a first method, when the paper sheet is a bank note issued by the Bank of Japan, it has marginal zones along the four edges on both the front and back sides, these zones being different in area for the front and back sides. Thus the difference in size of these marginal zones is detected by means of reflected light for discriminating whether the surface being sensed is in the front or back side.

With this known method, fluctuations in the reflected light may be caused due to contamination, breakage or folds of the marginal zones or to deflection or vibrations caused in the course of transport. The result is lowered precision in sensing and error caused in discrimination.

According to a second method, the difference in the pattern design on the front and back sides of the paper sheet is detected in terms of the difference in the amount of reflected light from the surface, and which is used as a criteria for discerning whether the front or reverse side of the paper sheet is being sensed. With this method, precision in sensing may be lowered due to fouling and deflection or vibrations caused during transport as with the first method.

According to a third method, the positions of magnetic ink printing zones are resorted to as the basis for judgment. With the third method, precision in sensing may be affected by strong or weak contact of the magnetic hand with the bank note. In addition, the bank note being sensed may be jammed due to contact with the magnetic head, thus giving rise to malfunction of the device.

SUMMARY OF THE INVENTION

It is an object of the present invention to provide extremely effective means for obviating the deficiency of the prior art. The present invention resides in the method of discriminating between the front and reverse sides and between the upper and lower edges of a paper sheet by optically scanning and sensing plural portions of the printed design of the paper sheet for deriving pattern signals indicative of the amount of light transmitted through the sheet, and by comparing these pattern signals with reference pattern signals.

BRIEF DESCRIPTION OF THE DRAWINGS

Reference is now had to the accompanying drawings showing the method of the present invention for discriminating between the front and reverse sides of a paper sheet and in which.

DESCRIPTION OF THE PREFERRED EMBODIMENT

Figure 1:
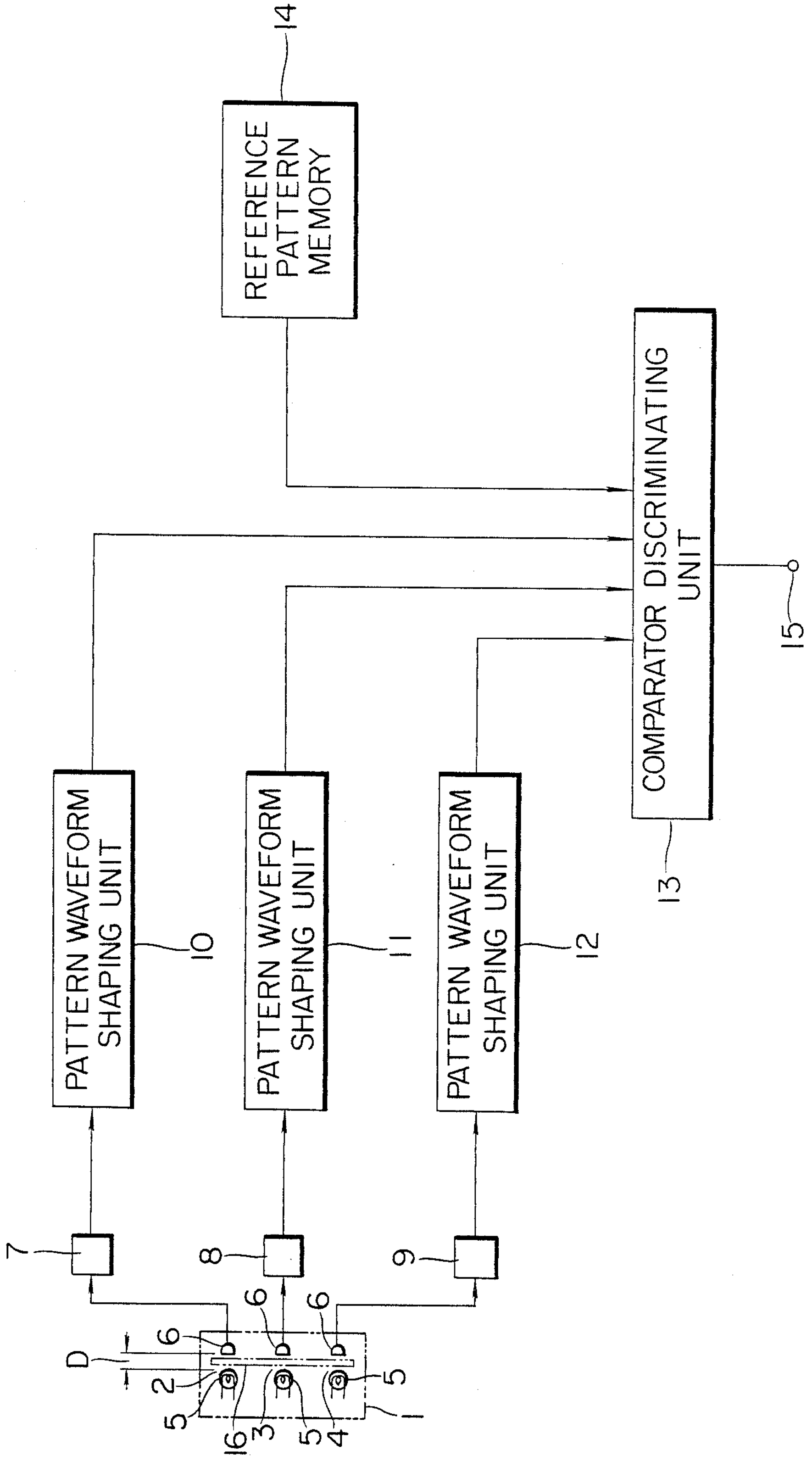
FIG. 1 is a schematic block view showing an electric circuit used for practicing the present invention.
Figure 2A:
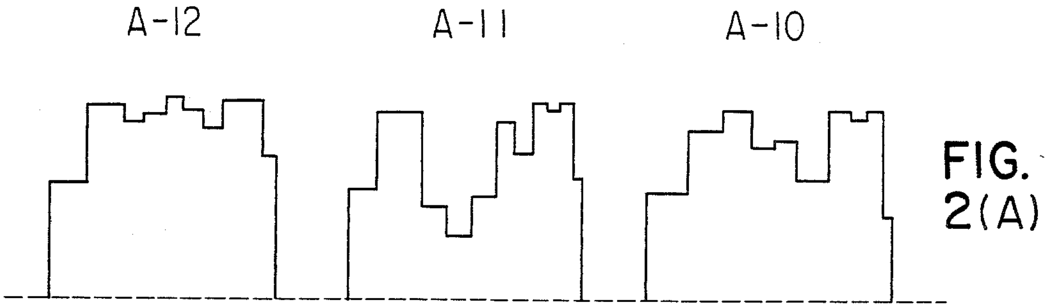
FIG. 2 shows waveforms of pattern signals delivered from light sensors during transport of the paper sheets.
Figure 2B:
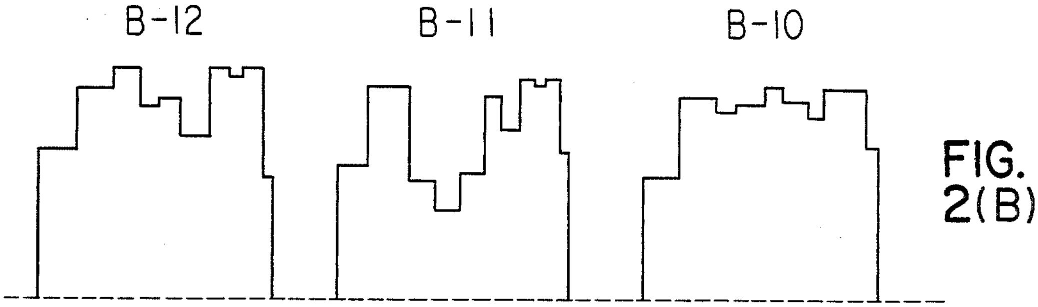
Figure 2C:
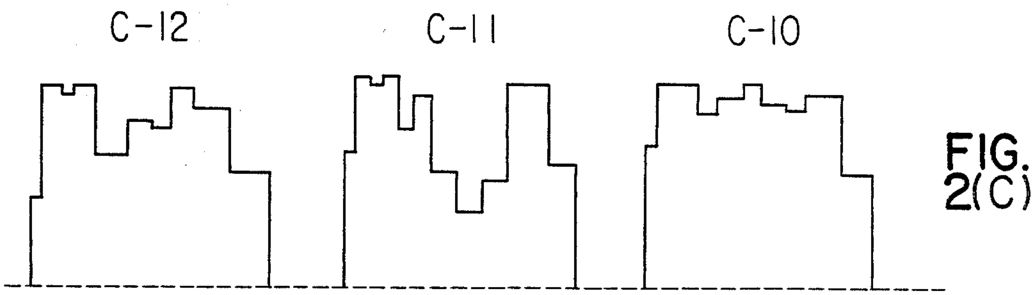
Figure 2D:
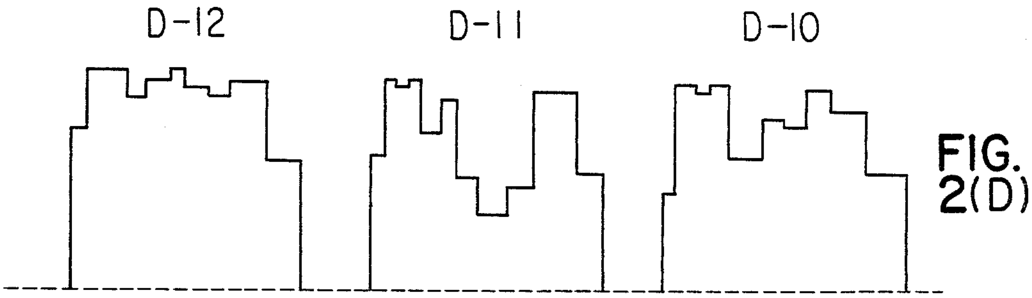

FIG. 1 is a schematic block view showing a circuit used for practicing the method of the present invention for discerning whether the paper sheet is placed with the front side up or with the front side down. The circuit has a sensor unit 1 for sensing the quantity of the transmitted light. The sensor unit 1 is composed of first, second and third light sensors 2, 3, 4 each consisting of a light source 5 and a light sensor element 6 separated from each other at a predetermined gap D. Each light source 5 may for example be an incandescent lamp, whereas each sensor element 6 may be formed by a photoelectric element or cds element or a light controlled semiconductor element such as a phototransistor.

The output from each sensor 2, 3, 4 is amplified respectively by first, second and third amplifiers 7, 8, 9 and supplied to first, second and third pattern waveform shaping units 10, 11, 12. The output pattern signals from the pattern waveform shaping units 10, 11, 12 are supplied to a comparator-discriminating unit 13 to be compared with reference pattern signals from a reference pattern memory 14. An output signal indicative of the front or reverse side of the paper sheet is supplied from an output terminal 15 of the comparator-discriminating unit 13.

The manner of discriminating between front and reverse sides of the paper sheet in accordance with the method of the present invention and through the use of the aforementioned circuit is described more fully below. A paper sheet 16 having printed pattern designs which are different on the front and reverse sides and unsymmetrical in the up and down and left and right directions is introduced in the horizontal or substantially horizontal position into the gap D. This paper sheet 16, which may be a bank note, is transferred through the gap under the following conditions.

(a) The bank note 16 is fed with its short side in the transfer direction and its long side perpendicular to the transfer direction.

(b) The normal transfer direction is one in which the bank note 16 is fed with the image of the person printed in the note being fed with the head side first. The transfer direction opposite thereto is the reverse transfer direction.

(c) The front side is the one on which the image of the person is printed, the opposite side being the reverse side.

When the bank note 16 is introduced into and transferred through the gap under the aforementioned conditions, pattern signals originated from the light sensors 2, 3, 4 and outputted from the pattern waveform shaping units 10, 11, 12 are as shown at A, B, C and D in FIG. 2. Three pattern signals are produced for each of the states A, B, C and D. Pattern signals outputted from the pattern waveform shaping units 10, 11, 12 through the sensors 2, 3, 4 are shown for each of these states. Thus the pattern signals A-10 through D-10 represent output waveforms proper to the bank note 16 and outputted from the first pattern waveform shaping unit; the pattern signals A-11 through D-11 represent output waveforms proper to the bank note 16 and outputted from the second pattern waveform shaping unit 11; and the pattern signals A-12 through D-12 represent output waveforms proper to the bank note 16 and outputted from the third pattern waveform shaping unit 12, with the note 16 being transferred under the four different states A through D. Thus the state A is the case in which the sheet is fed in forward with the front side upwards and the light transmitted therethrough from the back side; the state B the case in which the sheet is fed in forward with the back side upwards and the light is transmitted therethrough from the front side; the state C the case in which the sheet is fed in oppositely or reversed with the front side upwards and the light is transmitted therethrough from the back side; and the state D the case in which the sheet is fed in oppositely or reversed with the back side upwards and the light is transmitted therethrough from the front side.

As apparent from the waveforms of the pattern signals, with forward feed, the waveform A-11 of the signal pattern resulting from transmitted light from the back side and derived from the central second light sensor 3 is the same as the waveform B-11 of the signal pattern resulting from transmitted light from the front side and derived from the same sensor 3.

With reverse feed, the waveform C-11 of the signal pattern resulting from transmitted light from the reverse side is the same as waveform D-11 of the signal pattern resulting from light transmitted from the front side but it is a mirror image of the waveform A-11 or B-11 for the forward feed. From this it can be discerned whether the note 16 is fed in forward or in reverse.

Referring now to the waveform of the signal pattern indicative of changes in transmitted light and derived from the first and third light sensors 2, 4, the waveform A-10 of the pattern signal derived from the first light sensor 2 for forward feed and light transmitted from the back side is the same as the waveform B-12 of the pattern signal derived from the third light sensor 4 for forward feed and light transmitted from the front side; the waveform A-12 of the pattern signal derived from the third light sensor 4 for forward feed and light transmitted from the reverse side is the same as waveform B-10 of the pattern signal derived from the first sensor 2 for forward feed and light transmitted from the front side; the waveform C-12 of the pattern signal derived from the third sensor 4 for reverse feed and light transmitted from the reverse side is the same as the waveform D-10 of the pattern signal derived from the first sensor 2 for reverse feed and light transmitted from the front side; the waveform C-10 of the pattern signal derived from the first sensor 2 for reverse feed and light transmitted from the reverse side is the same as the waveform D-12 of the pattern signal derived from the third sensor 4 for reverse feed and light transmitted from the front side. The waveform A-10 of the pattern signal from the first sensor 2 for forward feed and light transmitted from the reverse side is the mirror image of the waveform C-12 of the pattern signal from the third sensor 4 for reverse feed and light transmitted from the reverse side; the waveform C-10 of the pattern signal from the first sensor 2 for reverse feed and light transmitted from the reverse side is the mirror image of the waveform A-12 of the pattern signal from the third sensor 4 for forward feed and light transmitted from the reverse side; the waveform D-10 of the pattern signal from the first sensor 2 for reverse feed and light transmitted from the front side is the mirror image of the waveform B-12 from the third sensor 4 for forward feed and light transmitted from the front side; and the waveform B-10 of the pattern signal from the first sensor 2 for forward feed and light transmitted from the front side is the mirror image of the waveform D-12 from the third sensor 4 for reverse feed and light transmitted from the front side.

It will be understood that the front or reverse side of the note 16 can be discerned easily from the aforementioned pattern waveforms. In the following, description is made of how the front or reverse sides of the bank note can be discerned for forward and reverse feeds through the sensors.

(a) Forward feed

With the signal pattern waveforms A-11, B-11 are the same as each other, when the waveform from the first sensor 2 is A-10 and the waveform from the third sensor 4 is A-12, the surface being sensed is the front side. Similarly, when the waveform from the first sensor 2 is B-10 and the waveform from the third sensor is B-12, the surface being sensed is the reverse side. In these cases, the pattern waveform B-10 is the same as the pattern waveform A-12, whereas the pattern waveform A-10 is the same as the pattern waveform B-12.

(b) Reverse feed

When the pattern waveform from the first sensor 2 is C-10 and the pattern waveform from the third sensor 4 is C-12, the surface being sensed is the front side. When the pattern waveform from the first sensor 2 is D-10 and the pattern waveform from the third sensor 4 is D-12, the surface being sensed is the reverse side. In these cases, the pattern waveform D-10 is the same as pattern waveform C-12, whereas the pattern waveforms, C-10, D-12 are identical with each other.

From the foregoing it is seen that the method of the present invention for discriminating the front and reverse sides of the bank note makes it possible to make such discrimination promptly without regard to occasional fouling, breakage or folds of the bank note based on pattern waveforms corresponding to design patterns derived from at least three light sensors.

What is claimed is:

1. A method for discriminating between the front and reverse sides, the upper and lower edges, and the left and right edges of a paper sheet having respectively different printed design patterns on its side front and reverse sides, the respective design patterns also being unsymmetrical as they extend between said upper and lower edges and between said left and right edges, said method comprising the steps of moving said sheet past three separate light transmitting and receiving sensors to substantially concurrently generate three respective electric output signals from said sensors; supplying said three electric signals respectively to three electronic waveform pattern shaping units to generate three respective waveform patterns representative of the respective sheet patterns moving past said sensors; generating twelve reference waveform patterns which, in respective combinations of three, are representative of four possible orientations of said sheet as it moves past said sensors, and storing said twelve patterns in a waveform pattern memory; and comparing said three sheet-representative waveform patterns with said twelve reference waveform patterns in a waveform comparator-discriminating unit to generate output signals which identify the respective facing directions of said front and reverse sides, said upper and lower edges, and said left and right edges of said sheet during its said movement.

* * * * *

UNITED STATES PATENT AND TRADEMARK OFFICE

CERTIFICATE OF CORRECTION

PATENT NO. : 4,557,597

DATED : December 10, 1985

INVENTOR(S) : T. Iwama

It is certified that error appears in the above-identified patent and that said Letters Patent is hereby corrected as shown below:

Column 1, line 23, the word "in" should be deleted.

Column 1, line 32, the word "and" should be deleted.

Column 3, line 33, second occurrence of "the" should be deleted.

Column 4, line 29, the comma after "waveforms" should be deleted.

Column 4, line 43, "side" should be --said--.

Signed and Sealed this

*Twenty-second* Day of *April 1986*

[SEAL]

*Attest:*

DONALD J. QUIGG

*Attesting Officer* *Commissioner of Patents and Trademarks*